(12) United States Patent
Kubo et al.

(10) Patent No.: US 9,219,833 B2
(45) Date of Patent: Dec. 22, 2015

(54) AUTOMATIC DOCUMENT FEEDER, IMAGE READING DEVICE, AND IMAGE FORMING APPARATUS

(71) Applicants: Hiroshi Kubo, Kanagawa (JP); Takashi Fujii, Kanagawa (JP); Shinya Kitaoka, Kanagawa (JP); Norio Kimura, Kanagawa (JP)

(72) Inventors: Hiroshi Kubo, Kanagawa (JP); Takashi Fujii, Kanagawa (JP); Shinya Kitaoka, Kanagawa (JP); Norio Kimura, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/637,933

(22) Filed: Mar. 4, 2015

(65) Prior Publication Data

US 2015/0264194 A1    Sep. 17, 2015

(30) Foreign Application Priority Data

Mar. 11, 2014    (JP) ................................ 2014-047272

(51) Int. Cl.
*G06F 15/00* (2006.01)
*G06K 1/00* (2006.01)
*G06K 15/00* (2006.01)
*H04N 1/00* (2006.01)

(52) U.S. Cl.
CPC ......... *H04N 1/0032* (2013.01); *H04N 1/00572* (2013.01); *H04N 1/00591* (2013.01); *H04N 1/00602* (2013.01); *H04N 1/00604* (2013.01); *H04N 1/00615* (2013.01); *H04N 2201/0094* (2013.01)

(58) Field of Classification Search
CPC ............ H04N 1/0032; H04N 1/00572; H04N 1/00591; H04N 1/00602; H04N 1/00604; H04N 1/00615; H04N 1/0094
USPC .................................................. 358/1.1–1.18
See application file for complete search history.

(56) References Cited

U.S. PATENT DOCUMENTS 7,201,368 B2 *   4/2007   Tanigami et al. .......... 270/58.11
7,409,175 B2 *   8/2008   Kim et al. .................... 399/107

FOREIGN PATENT DOCUMENTS

JP    2004-277144    10/2004
JP    2012-129668    7/2012

* cited by examiner

*Primary Examiner* — Douglas Tran
(74) *Attorney, Agent, or Firm* — Harness, Dickey & Pierce, P.L.C.

(57) ABSTRACT

An automatic document feeder comprises: a feeding unit that causes an image of a first side of a document to be read by a first image reading unit; a second image reading unit that reads an image of a second side of the document; a release unit that supports a reading guide opposite to a reading surface of the second image reading unit and enables underneath of the reading surface to be released; and a paper ejection tray on which the document having been subjected to image reading and ejected from a paper ejection roller pair is accumulated, wherein an end fence that rises up at a document ejection direction upstream side of the paper ejection tray is configured of separate members that are an upper portion and a lower portion, and a rotational pivot of the release unit is provided downstream from the end fence in a feeding direction.

13 Claims, 10 Drawing Sheets

AUTOMATIC DOCUMENT FEEDER, IMAGE READING DEVICE, AND IMAGE FORMING APPARATUS

CROSS-REFERENCE TO RELATED APPLICATIONS

The present application claims priority to and incorporates by reference the entire contents of Japanese Patent Application No. 2014-047272 filed in Japan on Mar. 11, 2014.

BACKGROUND OF THE INVENTION

1. Field of the Invention

The present invention relates to an automatic document feeder, an image reading device, and an image forming apparatus.

2. Description of the Related Art

In general, an automatic document feeder (hereinafter, simply referred to as "ADF") installed in an image reading device for reading an image of a document is adapted to separate and feed documents one by one from a bundle of documents loaded on a loading tray, towards a reading position. The image of the document fed by the ADF is read by an image reading means arranged at the reading position.

Further, now there are more ADFs of the one-pass system (hereinafter, also referred to as "one-pass ADFs"), which are able to read double sided documents without reversing the documents when images on both sides of the documents are to be read (for example, see Japanese Patent Application Laid-open No. 2004-277144).

This one-pass ADF is adapted to read a front side image of a document by a first image reading means and to read a back side image of the document by a second document reading unit, which is arranged on a feeding path in the ADF, for example.

Further, such one-pass ADFs have been generally installed in models high in feeding speed and reading speed, that is, models high in productivity and comparatively large in size (hereinafter, referred to as "large sized models") thus far.

However, in recent years, due to price reduction of the second document reading unit, productivity and machine downsizing are advancing, and in order to install the second document reading unit in a model of a comparatively small size (hereinafter, referred to as "small sized model"), a technique for dealing with the machine size and cost performance is now needed.

For models (hereinafter, referred to as "medium-sized models") that are high in productivity by having a medium machine size while being able to read A4-sized documents, demands for a model that realizes reading and image formation processing for A3-sized documents with approximately the same machine size are increasing.

In such medium sized models and small sized models, if the second document reading unit is arranged by using the existing document feeding path configuration like in the large sized models, various problems occur.

For example, the largest image formable recording material size of large sized models is A3, and the largest readable document size of one-pass ADFs installed therein is also A3. Therefore, not only the one-pass ADF, but also the whole image forming apparatus is large in size and there have hardly been any constraints on the distance from the image reading position of the first image reading means for reading the front side image of a document to a paper ejection port thereof.

On the contrary, the largest image formable recording material size of recent medium sized models and small sized models is A3 or A4, while the largest readable document size of many of the one-pass ADFs installed therein are starting to be A3 even if the largest recording material size is A4.

Further, the insertion-ejection direction of documents in the one-pass ADFs installed in the recent medium-sized models and small sized models are forced to be sideways due to the arrangement layout related to, for example: the operating unit being arranged in the front, the operating unit including a liquid crystal screen and various operation buttons, such as a numeric key pad; and the opening and closing operations of the ADFs.

Recording materials that have been subjected to the image formation processing are often ejected to the front of the model machines in consideration of effective utilization of installation space.

Considering these various factors, in reality, the internal space of the one-pass ADF installed in a medium-sized model or small-sized model is forced to be a narrow and small space, and there are hardly any differences between the document width (scanning direction) and the machine width and between the document length (sub-scanning direction) and the machine length.

Therefore, in the medium-sized models and small-sized models, in order to prevent a part of an ejected document from sticking out from the apparatus main body, the distance from the image reading position of the first image reading means to the paper ejection port needs to be shortened as much as possible.

However, simply shortening the distance from the second document reading unit to the paper ejection port has caused new problems.

A first one of such new problems is a problem of a constraint due to the installation space related to the paper ejection driven roller. Specifically, as the second document reading unit is downsized, due to the constraints of the above mentioned narrow and small space and machine width, the focal depth is narrowed and the focused position where the reading surface of the second document reading unit and the document are in focus is fixed more pinpointedly.

Therefore, the accuracy of the distance between the second document reading unit and the document needs to be improved, and the necessity is created, which is to cause the document to come into contact with the reading surface of the second document reading unit by arranging the reading guide, which comes into contact with the reading surface, opposite to the reading surface and causing the reading guide to be movable in the thickness direction correspondingly with the thickness of the document.

Further, since this reading guide is directly in contact with the reading surface when the document is not interposed between the reading surface and the reading guide, a low resistance plate-shaped member or a driven rotational roller which is associatively rotated by a feeding force of a document, is adopted therefor.

Accordingly, not only upstream of the second document reading unit, but also downstream therefrom, a need to arrange, near the paper ejection port, the paper ejection roller pair that nips and feeds a document, is created.

In order to shorten the distance that separates the paper ejection port from the second document reading unit, the paper ejection roller pair simply needs to be arranged near the reading guide, but since the space on the paper ejection port side is limited, the power transmission mechanism unit of the paper ejection roller pair must be arranged on the reading guide side and constraints are generated.

What is more, desirably, in order to realize space saving for the whole ADF, the space in the document feeding direction is configured to be not widened by the nip pressurizing direction of the paper ejection roller pair being made approximately parallel to the direction in which the end fence to be the upstream end wall of the document paper ejection tray rises up.

Further, a second one of the new problems is a problem of constraints related to maintenance of the reading surface. Specifically, since stains, paper powder, and the like adhere to the reading surface of the second document reading unit by feeding of documents thereon, in order to enable cleaning maintenance therefor, the lower side unit (hereinafter, referred to as "release unit") of the reading surface is configured to be releasable. Release of this release unit is an unnecessary configuration for a switch back system (two-pass system) that reads a back side image of a double sided document by reversing the document.

The release unit supports at least the above mentioned reading guide because the reading surface is aimed to be exposed.

Therefore, because the pressurizing mechanism, which causes this reading guide to be movable in the thickness direction correspondingly with the thickness of a document, needs to be arranged also in the lower side unit, in order to enable cleaning of the reading surface, a space that enables the release unit to be released over a wide range needs to be secured.

Accordingly, a shape of the release unit of the above described conventional technique is approximately a right triangle and a rotational pivot of the release unit is configured to be positioned near the right angle portion lower at the document feeding direction downstream end side and near the end fence.

However, when the distance separating the paper ejection roller pair or paper ejection port from the second document reading unit is shortened with the rotational pivot being at this position, a problem occurs that even if the release unit is opened, the reading unit is not exposed enough for the cleaning maintenance to be possible.

Figure 9:
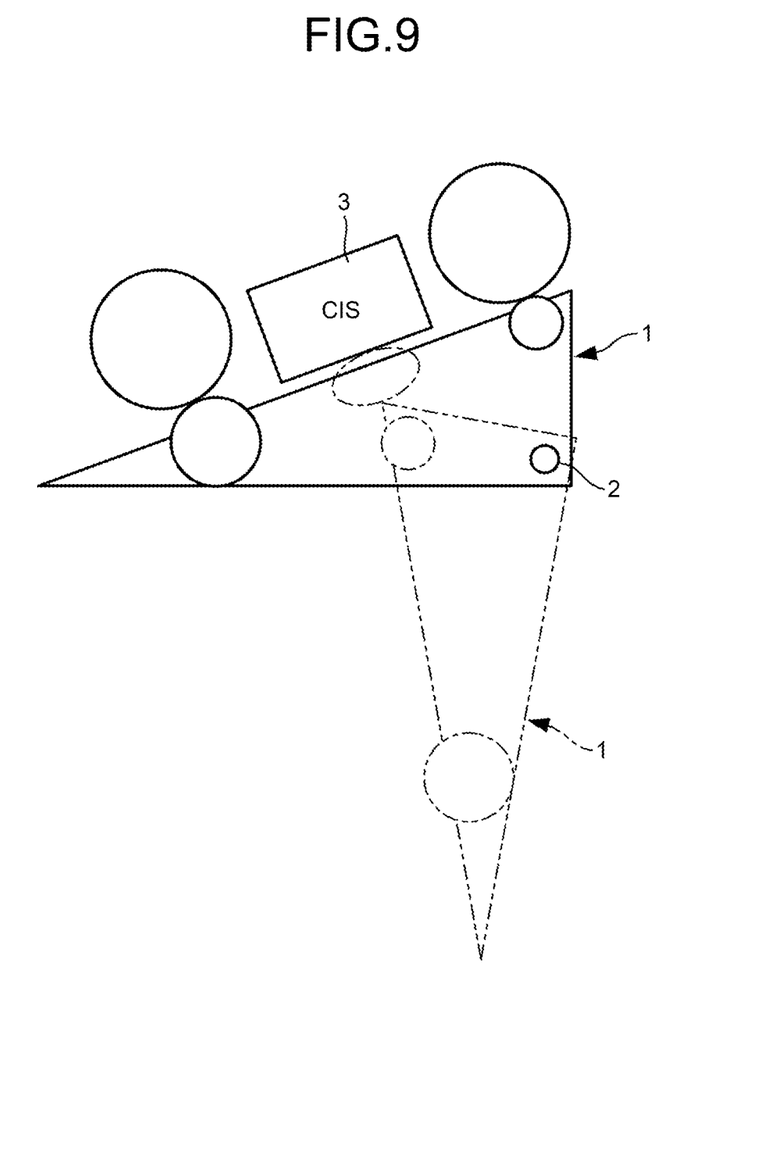
FIG. 9 is a diagram illustrating operations of an automatic document feeder of a first conventional example.

That is, as illustrated in FIG. 9, even if a release unit 1 is released with a pivot 2 as the center, the space below a second document reading unit (CIS) 3 is difficult to be secured.

Figure 10A:
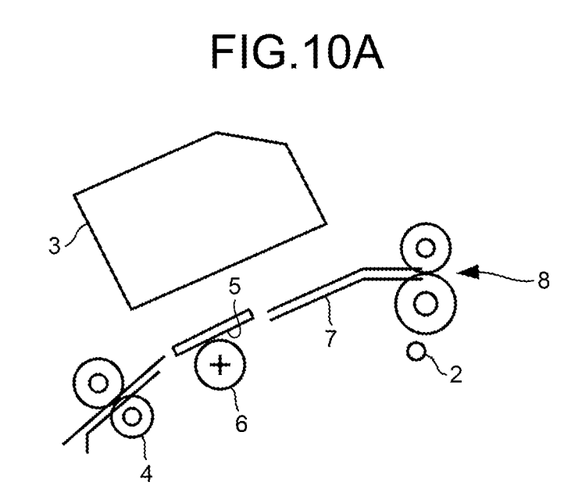
FIG. 10A is a diagram illustrating main parts in a used state and FIG. 10B is a diagram illustrating the main parts in a released state.
Figure 10B:
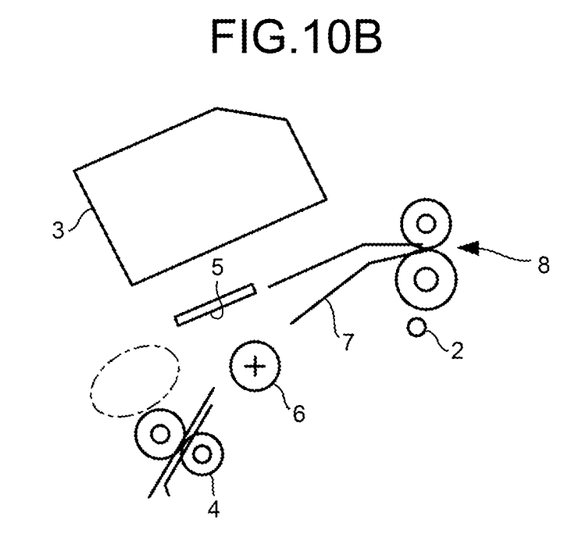

As illustrated in FIGS. 10A and 10B, the pivot 2 may be arranged above of more downstream side, to rotate a feeding roller pair 4 upstream of the CIS 3, a reading guide 6 opposite to a reading surface 5, and a feeding guide plate lower part 7 downstream from the CIS 3, around the pivot 2 (for example, Japanese Patent Application Laid-open No. 2012-129668).

If this configuration is adopted, the cleaning space is difficult to be secured even if the feeding roller pair 4, the reading guide 6, and the feeding guide plate lower part 7 are rotated around the pivot 2 from the normal position illustrated in FIG. 10A to a released position illustrated in FIG. 10B while the relation between the paper ejection roller pair 8 and the pivot 2 is maintained as the above-mentioned.

That is, considering the presence of a non-illustrated cover or the like of the ADF, even if the pivot 2 is provided near a position immediately below the paper ejection roller pair 8, above the feeding roller pair 4 upstream of the reading surface 5, only a narrow cleaning space is able to be secured and cleaning maintenance is very difficult to be performed.

Therefore, in order to perform cleaning maintenance of the reading surface 5, a configuration to cause the reading surface 5 to be movable or detachable independently of the partial unit including the feeding roller pair 4 is separately needed and thus the structure becomes complicated, increase in size of the apparatus is caused, and the cost is increased much.

Further, a third one of the new problems is a problem of a constraint on the release unit configuration itself. Specifically, since the feeding path length of a one-pass ADF installed in a large-sized model is long, feeding roller pairs are arranged both upstream of and downstream from the second document reading unit.

The feeding roller pair arranged downstream is a roller pair that is different from the above described paper ejection roller pair. As for an ADF installed in a medium sized model or small sized model, as described with respect to the above described constraints of the first and second problems, a roller pair downstream from the second document reading unit serves both as a feeding roller pair and a paper ejection roller pair.

If another feeding roller pair is arranged between the second document reading unit and the paper ejection roller pair, nip pressure does not need to be applied to the paper ejection roller pair and thus the nip feeding function is not regarded as important, but if only a paper ejection roller pair is arranged at one place downstream from the second document reading unit, nip pressure is needed.

Therefore, in order to furnish the paper ejection roller pair with feeding qualities, such as magnification, skew, and nip feeding, the nip pressure needs to be sufficiently secured, and when the release unit is released, unless this nip pressure of the paper ejection roller pair is relieved, paper jam or the like becomes difficult to be removed.

That is, constraints are created, that in order to realize space saving for ADFs, the paper ejection roller paper must also serve as a feeding roller pair downstream from the second document reading unit and that in order to set the nip force high, the nip pressure must be caused to be relievable when paper jam is dealt with.

Figure 11A:
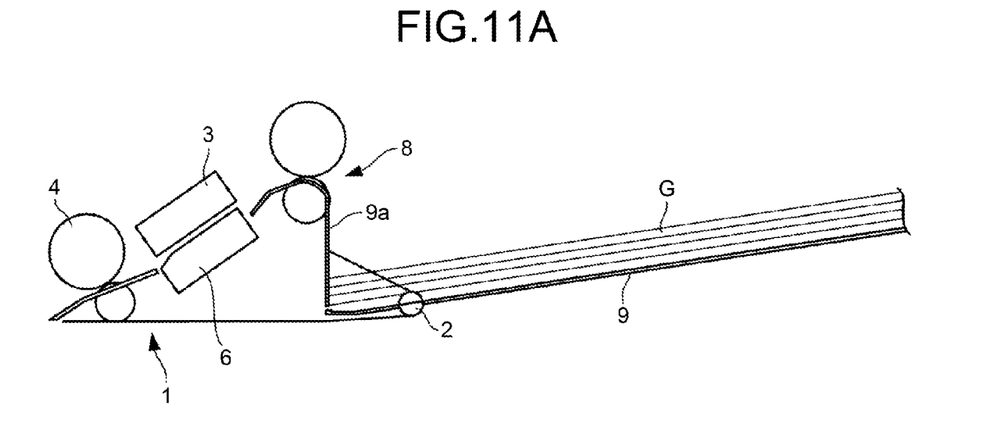
FIG. 11A and FIG. 11B are diagrams illustrating operations for describing a problem in a case where a rotational pivot has been separated.
Figure 11B:
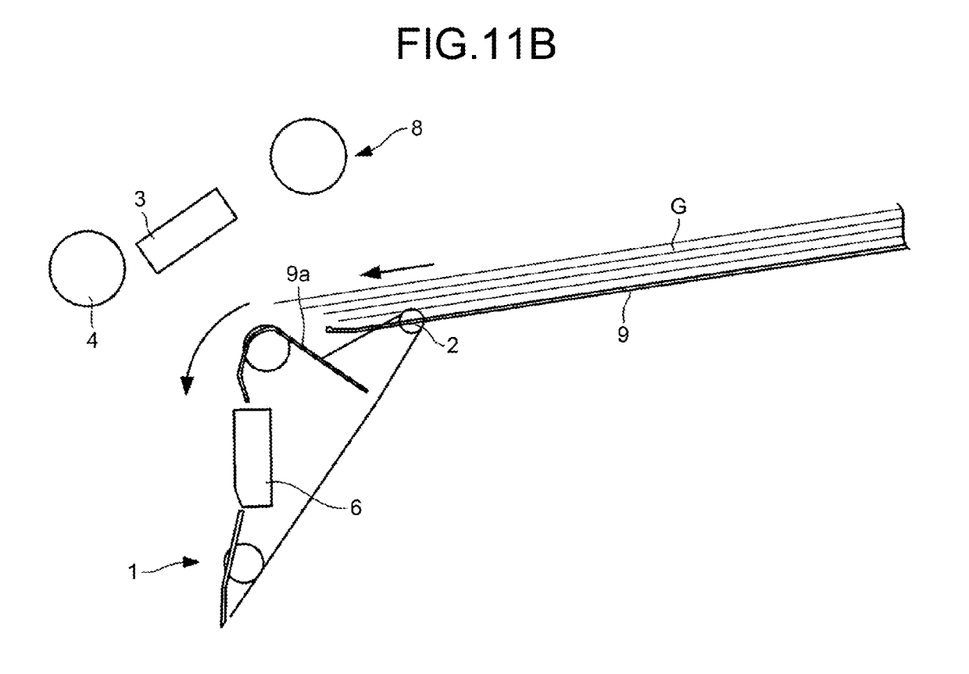

Further, a fourth one of the new problems is a problem of a constraint on a configuration of the end fence. That is, against the above described second problem, as illustrated in FIG. 11A, by arranging a position of the pivot 2 of the release unit 1 at a position away from the CIS 3, as illustrated in FIG. 11B, the CIS 3 is able to be exposed when the release unit 1 is released.

If the position of the pivot 2 of the release unit 1 then is simply positioned away from the CIS 3, because of the need to arrange the paper ejection roller pair 8 near an end fence 9a, the end fence 9a must be provided, separately from a paper ejection tray 9 on which documents G are accumulated, in the release unit 1.

However, when the end fence 9a is provided in the release unit 1, upon release, the end fence 9a is displaced by integrally rotating around the pivot 2 and thus when the release unit 1 is released for dealing with paper jam and maintenance, there is a risk that the documents G may fall off from the paper ejection tray 9.

In view of the above circumstances, there is a need to provide an automatic document feeder, an image reading device, and an image forming apparatus, which enable, when a release unit is released, a space to be secured below a reading surface, documents to be prevented from sticking out or falling off, and a nip pressure of a paper ejection roller pair to be relieved, even if a distance from a second document reading unit to a paper ejection port is shortened.

SUMMARY OF THE INVENTION

It is an object of the present invention to at least partially solve the problems in the conventional technology.

According to the present invention, there is provided an automatic document feeder, comprising: a feeding unit that causes an image of a first side of a document to be read by a first image reading unit while feeding the document; a second image reading unit that reads an image of a second side of the document while the feeding unit feeds the document; a release unit that supports a reading guide opposite to a reading surface of the second image reading unit and enables underneath of the reading surface to be released; and a paper ejection tray on which the document that has been subjected to image reading and ejected from a paper ejection roller pair is accumulated, wherein, an end fence that rises up at a document ejection direction upstream side of the paper ejection tray is configured of separate members that are an upper portion and a lower portion, and a rotational pivot of the release unit is provided downstream from the end fence in a feeding direction.

The present invention also provides an image reading device comprising: a first image reading unit that reads the image of the first side of the document; and the above-described automatic document feeder.

The present invention also provides an image forming apparatus comprising: a first image reading unit that reads the image of the first side of the document; and the above-described automatic document feeder.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10A and FIG. 10B illustrate an automatic document feeder of a second conventional example, where

DETAILED DESCRIPTION OF THE PREFERRED EMBODIMENTS

Hereinafter, an embodiment of the present invention will be described by use of the drawings.

Figure 1:
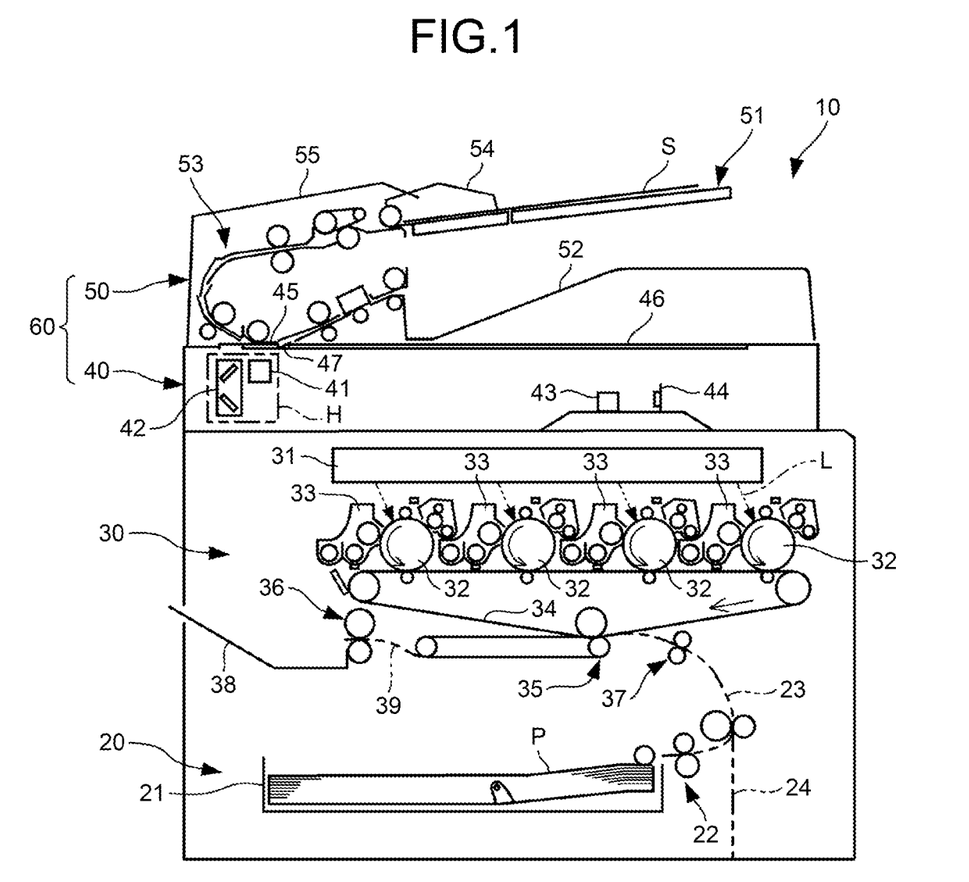
FIG. 1 is a diagram of a schematic configuration of an image forming apparatus according to an embodiment of the present invention.

FIG. 1 is a diagram illustrating an embodiment of an image forming apparatus including an image reading device according to the present invention, and illustrates an example in which the image forming apparatus has been applied to a copying machine 10 of an electrophotographic system. Examples of the copying machine 10 include, for example, a full color copying machine that forms an image by using a general electrostatic image forming method and a copying machine that generates a monochrome image. Further, as the image forming system, other than the electrophotographic system, an ink jet system or the like may be used, for example. Further, other than being configured as the copying machine 10, the above mentioned image forming apparatus including the image reading device according to the present invention may be configured as a facsimile apparatus, a printing machine, or a multifunction peripheral.

Overall Configuration of Copying Machine

As illustrated in FIG. 1, the copying machine 10 includes a paper feeding unit 20, an image forming unit 30, an image reading unit 40, and an automatic document feeder (hereinafter, also simply referred to as "ADF") 50. Further, in this embodiment, the image reading unit 40 and the ADF 50 configure an image reading device 60.

Configuration of Paper Feeding Unit 20

The paper feeding unit 20 has a paper feeding cassette 21 that is able to accommodate therein sheets of recording paper P. The paper feeding unit 20 has a paper feeder 22 that picks up and feeds the recording paper P, which is a recording material accommodated in the paper feeding cassette 21, from the topmost sheet in order. The paper feeding unit 20 has a paper feeding path 23 through which the recording paper P fed from the paper feeder 22 is fed to a predetermined image forming position of the image forming unit 30. Below the paper feeding unit 20, for example, a multi-stage paper feeder (not illustrated) is able to be optionally installed, and a connection path 24 for delivering the recording material fed from that paper feeder is connected to the paper feeding path 23.

Configuration of Image Forming Unit 30

The image forming unit 30 includes: an exposure device 31; a plurality of photoconductor drums 32; developing devices 33 filled with toners of different colors, which are cyan (C), magenta (M), yellow (Y), and black (K); a transfer belt 34; a secondary transfer unit 35; and a fixing unit 36.

Based on a read image read by the image reading device 60, for example, the image forming unit 30 exposes each of the photoconductor drums 32 to light (laser light L) by the exposure device 31 and forms a latent image on each of the photoconductor drums 32. Thereby, the developing devices 33 respectively supply the toners of the different colors to the photoconductor drums 32 to perform developing.

After the image forming unit 30 primarily transfers an image developed on each photoconductor drum 32 to the transfer belt 34 and secondarily transfers a toner image to recording paper P by the secondary transfer unit 35, the image forming unit 30 melts the toner image secondarily transferred to the recording paper P by the fixing unit 36 and fixes a color image on the recording paper P.

Although a detailed configuration thereof will be omitted, the image forming unit 30 has a feeding path 39 where the recording paper P fed to the paper feeding path 23 of the paper feeding unit 20 is taken over, passed through the secondary transfer unit 35 and fixing unit 36 in synchronization with a resist unit 37, and ejected to an accumulation tray 38.

Configuration of Image Reading Unit 40

The image reading unit 40 includes a first carriage 41, in which a light source and a mirror member are installed, a second carriage 42, in which a mirror member is installed, an image forming lens 43, and an imaging unit 44.

When the image reading unit 40 reads an image of a front side, which is a first side of a document S fed by the ADF 50 at a reading position R (see FIG. 2), the image reading unit 40 moves the first carriage 41 immediately below a slit glass 45 (a position indicated with a symbol H in FIG. 1) and causes the first carriage 41 to stop at that reading position R.

The first carriage 41 irradiates the document S passing the slit glass 45 with illumination light from the light source. Reflected light transmitted through the slit glass 45 and reflected by the document S goes to each of the mirror members installed in the first carriage 41 and second carriage 42, is caused by the image forming lens 43 to form an image at the imaging unit 44 and to be read as a read image. At the reading position R, the image of the front side of the document S is in conjugate with the imaging unit 44 in relation to the image forming lens 43.

If a document placed on a platen glass 46 in a state where the sheet is abutted against an abutting member 47 is to be read, the first carriage 41 and second carriage 42 are moved in a left-right direction (sub-scanning direction) in FIG. 1. In a process of moving the carriages 41 and 42, the document S is irradiated with light by the light source and reflected light from the document S is turned back by each of the mirror members installed in the carriages 41 and 42. An image of that reflected light is formed by the image forming lens 43 and read by the imaging unit 44.

As to various controls of the above described paper feeding unit 20, image forming unit 30, and image reading unit 40, driving or the like thereof is controlled by a main body control unit not illustrated, but these various controls use well known techniques and thus detailed description thereof will be omitted.

Configuration of ADF 50

The ADF 50 has: on a top stage thereof, a document tray 51 as a document loading tray; and on a bottom stage thereof, a paper ejection tray 52, on which documents S that have been subjected to image reading are accumulated, and the ADF 50 includes, between the document tray 51 and the paper ejection tray 52, a feeding unit 53 formed of various rollers and the like.

The ADF 50 separates the documents S one by one from the topmost one from a document bundle of the documents S placed on the document tray 51 and feeds the separated topmost document S onto the slit glass 45 by the feeding unit 53.

After reading a front side image of a first side of the document S by the image reading unit 40 when the document S passes the slit glass 45, the ADF 50 ejects the document S to the paper ejection tray 52. Further, the ADF 50 is attached to be freely openable and closable with respect to the platen glass 46, which is a top surface of the image reading unit 40, via an open and close mechanism, such as a hinge mechanism, which is not illustrated.

Next, with reference to FIG. 2 and FIG. 3, a detailed configuration of the ADF 50 will be described.

Figure 2:
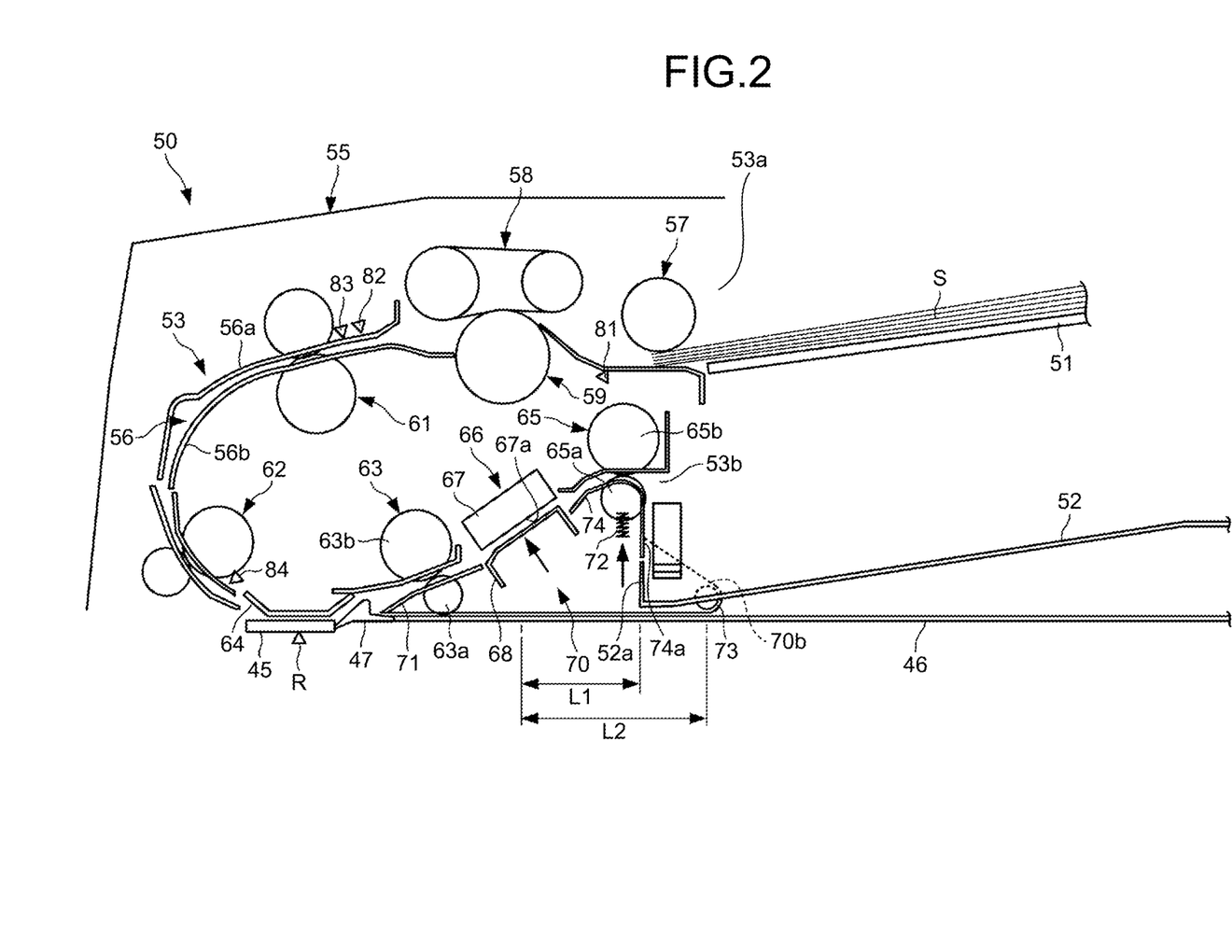
FIG. 2 is a diagram of a schematic configuration of a closed state of a release unit of an automatic document feeder according to the embodiment of the present invention.
Figure 3:
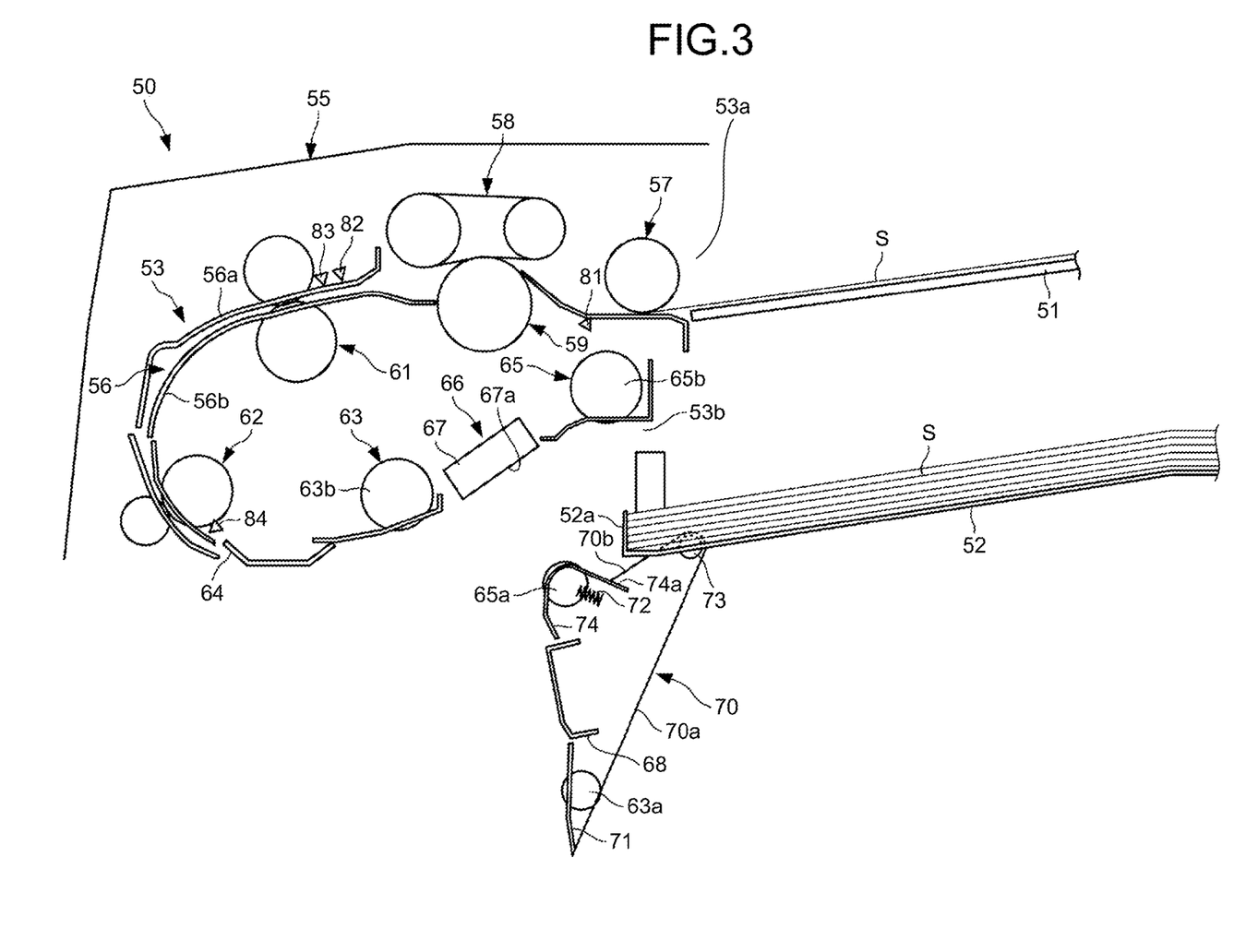
FIG. 3 is a diagram of a schematic configuration of a released state of the release unit of the automatic document feeder according to the embodiment of the present invention.

As illustrated in FIG. 2 and FIG. 3, the document tray 51 is arranged to be slanted upward such that, when a feeding unit 53 side thereof is referred to as a leading end side of the document S, this leading end side is down and a tail end side thereof is up. The document tray 51 has a side guide plate 54 (illustrated only in FIG. 1) for registration in a left-right direction orthogonal to a paper feeding direction of the document S heading to the feeding unit 53.

This side guide plate 54 may be either of: those that relatively come close to and separate from each other so as to match the width direction centers of the document tray 51 and the document S; or those arranged such that one of edges of the document S is abutted against one at one of edge sides of the document tray 51 and only one at the other one of the edge sides is movable.

Figure 4:
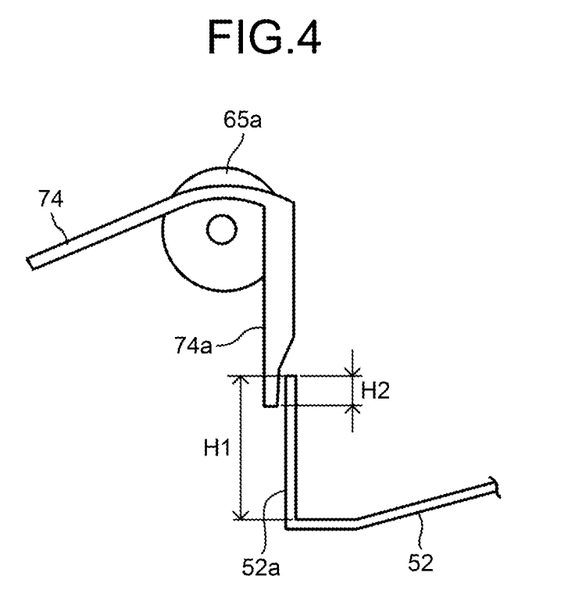
FIG. 4 is a diagram illustrating what is around an end fence in the automatic document feeder according to the embodiment of the present invention.

The paper ejection tray 52 has, at an upstream end thereof, an end fence lower portion 52a formed therein, which rises up in an approximately vertical direction when the ADF 50 is brought into a used state with respect to the image reading unit 40. As illustrated in FIG. 4, a height H1 of the rise of the end fence lower portion 52a is set higher than a height in accumulating direction of a load specification number of documents S set for the paper ejection tray 52 with reference to the maximum load of the documents S that are able to be placed on the document tray 51.

Figure 5:
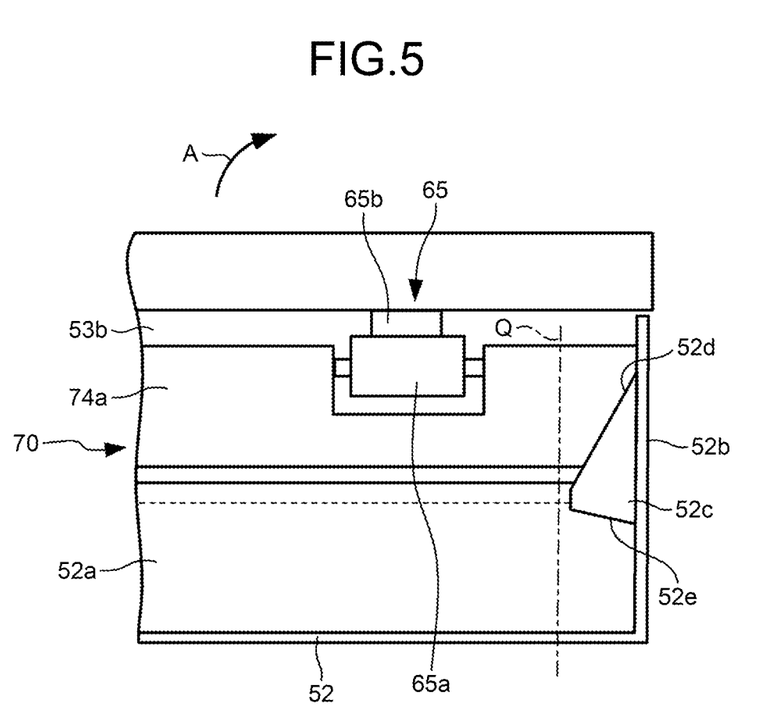
FIG. 5 is a diagram illustrating what is around a document fall-off restriction member in the automatic document feeder according to the embodiment of the present invention.

The paper ejection tray 52 includes a document fall-off restriction member 52c, on at least a wall surface 52b, which is on one side of the paper ejection tray 52 in a width direction orthogonal to a feeding direction of the document S, and which is, when the ADF 50 is released, at a rotational pivot side of the paper ejection tray 52 and at a lower side of the paper ejection tray 52, as illustrated in FIG. 5, the document fall-off restriction member 52c protruding towards the other side of the paper ejection tray 52.

The document fall-off restriction member 52c has an upper guide surface 52d, which is slanted downward towards the other side, and a lower guide surface 52e, which is slanted upward towards the other side.

The upper guide surface 52d is positioned lower than a paper ejection port 53b and the lower guide surface 52e is positioned lower than an upper edge of the end fence lower portion 52a.

The upper guide surface 52d is set at an inclination angle that is steep to a certain degree, such that side edges of the documents S are aligned with one another at a position illustrated with Q in the figure when the documents S fall down from the paper ejection port 53b.

Further, the lower guide surface 52e is in an inclined state with the ADF 50 having been rotated (see an arrow A in FIG. 5) when a later described release unit 70 is released. Therefore, when the release unit 70 is rotated, with a rotational axis 73 being a pivot, in a depth direction of the page of FIG. 5, if many documents S that have been subjected to image reading are placed in a bundle on the paper ejection tray 52, that document bundle is moved from the position Q to the wall surface 52b by the slant of the ADF 50.

Thus, in order to prevent the documents S from accidentally falling off due to such movement of the document bundle, if the documents S are slid under the lower guide surface 52e, the documents S are able to be caught by the lower guide surface 52e. The inclination angle of the lower guide surface 52e just needs to be an angle such that the documents S are able to slide under the lower guide surface 52e, and thus does not need to be set at an angle that is as steep as the upper guide surface 52d. On the contrary, if the inclination is set at a steep angle, the sliding of the documents S is lessened and the documents S are not able to be restrained from falling off.

The feeding unit 53 is covered by a cover 55, which enables at least the top thereof to be openable and closable and which is positioned above a part of a leading end of the document tray 51. The feeding unit 53 has, at an upstream end thereof, a paper feeding port 53a that opens such that a leading end of the document S faces inside the cover 55. The feeding unit 53 has a document feeding path 56 for the documents S, the document feeding path 56 being over an area from the paper feeding port 53a to the paper ejection port 53b above the paper ejection tray 52 and being formed of, for example, feeding guide plates 56a and 56b opposite to each other, a rib (not illustrated) that rises up from a reverse side of the cover 55, and the like.

The feeding unit 53 has, as a document feeding unit, in order from an upstream side of the document feeding direction of the documents S, a pick up roller 57 arranged above the leading end of the document tray 51, and a paper feeding belt 58 and a reverse roller 59, which are arranged to be opposite to each other with the document feeding path 56 interposed therebetween.

The pick up roller 57 picks up, at a contact position, a few (ideally, one) of the documents S from the topmost one, the documents S having been placed on the document tray 51.

The paper feeding belt 58 rotationally moves along the document feeding direction and the reverse roller 59 rotates in a direction opposite to the document feeding direction. If more than one document S is attempted to be fed, the reverse roller 59 restrains any document S other than the topmost one from being fed with the topmost one by rotating in the direction opposite to the direction in which the paper feeding belt 58 is rotationally moved.

The feeding unit 53 has a plurality of feeding roller pairs 61 to 63, which nip and feed the document S, with each of the plurality of feeding roller pairs 61 to 63 interposing the document feeding path 56 and being opposite to each other. The number of these feeding roller pairs 61 to 63 to be arranged and the places to arrange these feeding roller pairs 61 to 63 are arbitrary depending on, for example, the path design of the document feeding path 56, the minimum document feeding direction length of a document S allowed by the ADF 50, and the like.

The feeding roller pair 61 is arranged downstream of and adjacent to the paper feeding belt 58, and has a leading end adjustment function of correcting skew conveyance by causing a leading end of a fed document S to be abutted thereagainst according to a drive timing of the pick up roller 57 and pulling out and feeding the corrected document S.

The feeding unit 53 has: a reading guide 64, which is arranged above and opposite to the slit glass 45, and causes an image of the document S to be read; and a paper ejection roller pair 65, which is arranged upstream of and immediately before the paper ejection port 53b and ejects the document S from the paper ejection port 53b towards the paper ejection tray 52.

The reading guide 64 is biased towards the slit glass 45 by use of a biasing member, such as a coil spring not illustrated, and while a document S is being fed, causes the document S to closely contact the slit glass 45.

The feeding unit 53 has a second image reading device 66 on a path on which the document S is fed comparatively linearly, the path being downstream from the reading guide 64 and between the feeding roller pair 63 and the paper ejection roller pair 65.

The second image reading device 66 has a second image reading unit 67 that reads an image on a back side, which is a second side, of the document S, and a second reading guide 68 that is arranged to be opposite to the second image reading unit 67 with the document feeding path 56 interposed between the second image reading unit 67 and the second reading guide 68.

Figure 6:
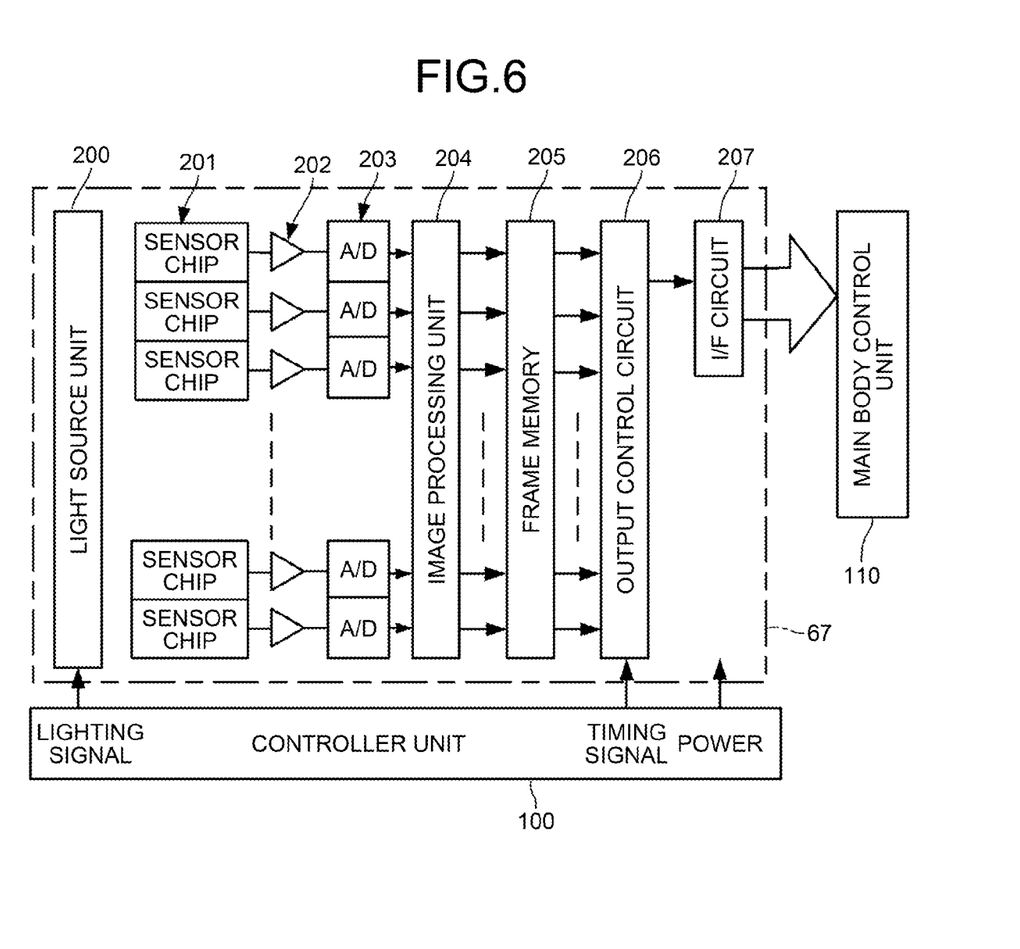
FIG. 6 is a block configuration diagram of a second image reading unit in the automatic document feeder according to the embodiment of the present invention.

The second image reading unit 67 is configured of, as illustrated in FIG. 6, a light source unit 200, sensor chips 201, an image processing unit 204, a frame memory 205, an output control circuit 206, an interface circuit (hereinafter, referred to as "I/F circuit") 207, and the like.

The light source unit 200 is formed of an LED array, a fluorescent lamp, a cold cathode tube, or the like. The plurality of sensor chips 201 are arranged to be lined in a main-scanning direction (a direction corresponding to a document width direction). A plurality of operational amplifier circuits 202 are individually connected to the plurality of sensor chips 201, respectively. A plurality of A/D convertors 203 are individually connected to the plurality of operational amplifier circuits 202, respectively.

The sensor chip 201 includes, for example, although not illustrated, a photoelectric conversion element called equal magnification contact image sensor, and a condenser lens. Before a document S advances to a reading position by the second image reading unit 67, a lighting signal is sent from a controller unit 100 to the light source unit 200. Thereby, the light source unit 200 lights up and irradiates the second side (back side) of the document S with that light.

Reflected light reflected by the back side of the document S is condensed to the photoelectric conversion element by the condenser lens and read as image information, in the plurality of sensor chips 201. The image information read by each of the sensor chips 201 is amplified by the operational amplifier circuit 202 and thereafter converted to digital image information by the A/D converter 203.

The digital image information obtained as described is input to the image processing unit 204 to be subjected to shading correction and the like, and thereafter temporarily stored in the frame memory 205. Thereafter, after the digital image information is converted by the output control circuit 206 to a data format acceptable to a main body control unit 110 (a control unit of the copying machine 10 main body), the converted digital image information is output to the main body control unit 110 via the I/F circuit 207 as image data. From the controller unit 100, a timing signal for notifying a timing at which a leading end of a document S reaches the reading position by the second image reading unit 67 (image data at that timing and after are treated as effective data), a lighting signal of a light source, power, and the like are output.

The second reading guide 68 suppresses floating of the document S at the second image reading unit 67, and at the same time, serves also as a reference white unit for obtaining shading data in the second image reading unit 67. If reading of the back side image of the document S is not performed, the document S simply passes through the second image reading unit 67.

The feeding unit 53 has various sensors arranged therein, such as a document set sensor 81, a separation sensor 82, a document width sensor 83, and a resist sensor 84. Each of these sensors 81 to 84 is just an example, and in the document feeding path 56 of the feeding unit 53, a paper jam sensor and the like other than these sensors 81 to 84 are arranged as appropriate.

The document set sensor 81 is arranged between the pick up roller 57 and the reverse roller 59, and detects whether or not a document S has been set in the document tray 51. Although a detailed peripheral configuration of this document set sensor 81 is omitted, when a document S is set in the document tray 51, a distance between the leading end of the document tray 51 and the pick up roller 57 is variable, for example. Thereby, by the document set sensor 81 arranged downstream from the pick up roller 57, setting of the document S is able to be detected.

The separation sensor 82 is arranged between the paper feeding belt 58 and the feeding roller pair 61 and detects whether a document S is staying in the document feeding path 56. The separation sensor 82 outputs a signal when a document S passes the document feeding path 56. Further, the separation sensor 82 continues to output a signal if a document S is sheet-jammed and is staying.

The document width sensor 83 is a sensor having a plurality of optical sensors formed of reflection type photosensors or the like lined up in the document width direction (a direction orthogonal to the page of FIG. 2). Based on which combination of these plurality of optical sensors detects the document S, a width direction size of the document S is able to be detected. A length of the document S is able to be found by, for example, detection times by the separation sensor 82 and document width sensor 83 and a feeding velocity.

The resist sensor 84 is arranged upstream of the reading position R and detects a timing to start reading, by detecting a leading end of a document S.

Figure 7:
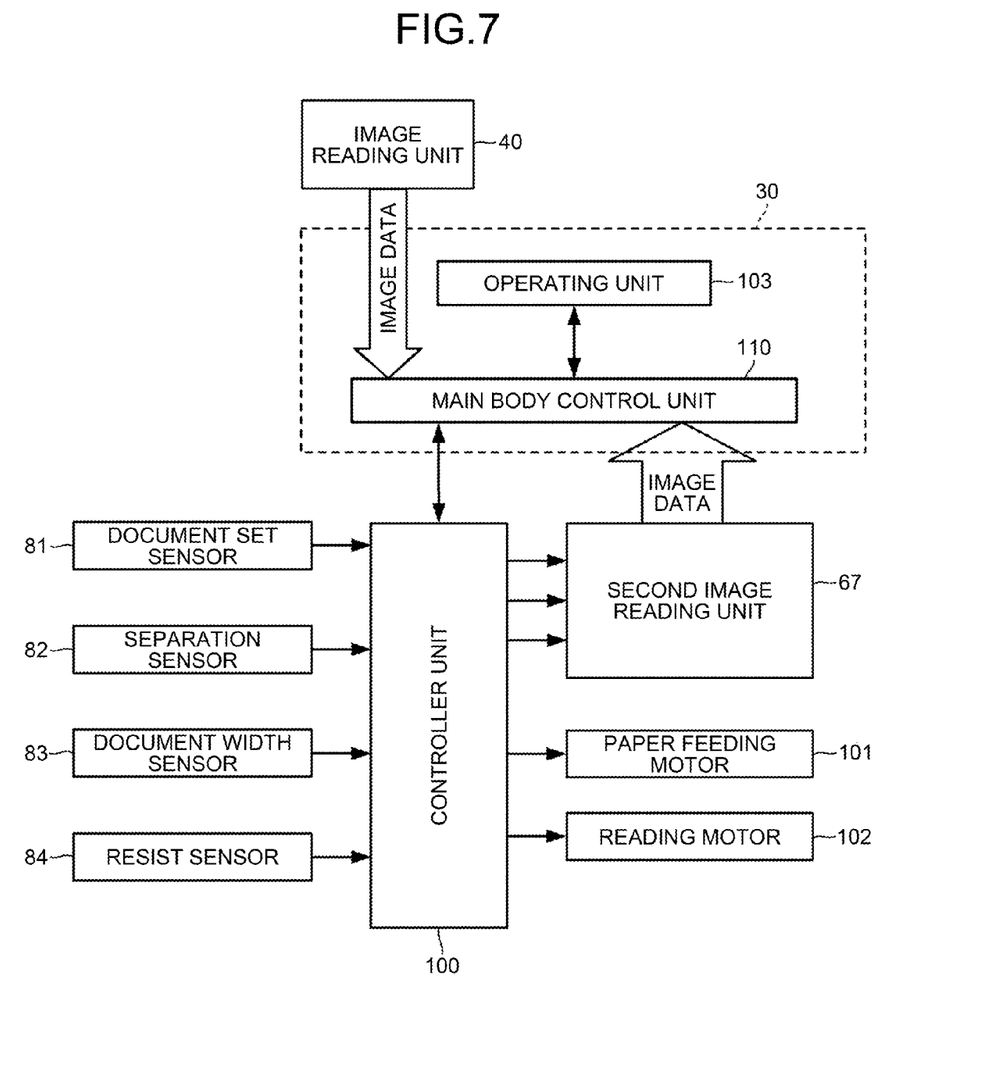
FIG. 7 is a control block diagram of a control unit in the automatic document feeder according to the embodiment of the present invention.

Results of the detection by these sensors 81 to 84 are output to the controller unit 100, as illustrated in FIG. 7. The controller unit 100 is a CPU or the like arranged inside the ADF 50 and is controlled by the main body control unit 110 of the image forming unit 30, which is the image forming apparatus main body. The controller unit 100, for example, drives to rotate a paper feeding motor 101 and a reading motor 102 forward when, a leading end of the document S is detected by the document set sensor 81 and the controller unit 100 receives a reading start signal from the main body control unit 110 by a reading start operation or the like of an operating unit 103.

By the paper feeding motor 101 being driven to be rotated forward, the pick up roller 57 is driven to be rotated in the feeding direction and the paper feeding belt 58, the reverse roller 59, and the feeding roller pairs 61 and 62 are driven to be rotated in a predetermined direction via a gear and the like not illustrated. By the reading motor 102 being driven to be rotated forward, the feeding roller pair 63 and paper ejection roller pair 65 are respectively driven to be rotated in the feeding direction.

Further, during that process, according to the results of the detection by the separation sensor 82, the document width sensor 83, and the resist sensor 84, predetermined processing is executed.

For example, if the resist sensor 84 detects a leading end of a document S heading to the reading position R, the controller unit 100 decreases a driving velocity of each motor over a predetermined time period. Thereby, the feeding velocity of the document S is decreased over a predetermined feeding distance. The controller unit 100 controls to temporarily stop the document S before the reading position R, where an image of a first side of the document S is read by the image reading unit 40. Further, along with the control for this temporary stop, the controller unit 100 transmits a resist stop signal to the main body control unit 110.

Subsequently, when the controller unit 100 receives a reading start signal from the main body control unit 110, the controller unit 100 starts driving of the paper feeding motor 101 and the reading motor 102. When this is done, before the leading end of the document S that has been resist-stopped reaches the reading position R, the controller unit 100 controls driving of the paper feeding motor 101 and reading motor 102 such that the feeding velocity of the document S attains a predetermined feeding velocity. Thereby, the document S is fed towards the reading position R while the feeding velocity is being increased, and image data read by the image reading unit 40 are output to the main body control unit 110.

In the ADF 50, a part of the document feeding path 56 from the abutting member 47 to the paper ejection port 53b is configured of the release unit 70. The release unit 70 is arranged below the second image reading device 66.

Configuration of Release Unit 70

The release unit 70, has, as one unit: a guide plate lower part 71 on an upstream side; a driven roller 63a of the feeding roller pair 63; the second reading guide 68; a driven roller 65a of the paper ejection roller pair 65; a coil spring 72; the rotational axis 73; and a guide plate lower part 74 on a downstream side. Although not illustrated, the release unit 70 includes a coil spring or the like that pressurizes the driven roller 63a of the feeding roller pair 63 towards the drive roller 63b, and a coil spring or the like that pressurizes the second reading guide 68 towards the second image reading unit 67. Each of these pressurizing members is supported in the release unit 70, similarly to the coil spring 72.

The guide plate lower part 71 forms a portion of the document feeding path 56, the portion being upstream of the second image reading device 66, and the guide plate lower part 74 forms a portion of the document feeding path 56, the portion being downstream of the second image reading device 66, such that the guide plate lower parts 71 and 74 also serve as a top cover of the release unit 70. Further, a portion of the guide plate lower part 74 is cross-sectionally bent downward to form a lower side of the paper ejection port 53b and this downward bent portion forms an end fence upper portion 74a. Thereby, the end fence lower portion 52a and the end fence upper portion 74a form on the same plane an end fence that aligns upstream end edges of documents S that have been subjected to image reading.

The end fence lower portion 52a and the end fence upper portion 74a are preferably on the same plane to align the upstream end edges of the documents S but as long as the end fence lower portion 52a is upstream of the end fence upper portion 74a, the documents S are able to be restrained from being caught. That is, by the end fence upper portion 74a protruding more forward in the feeding direction than the end fence lower portion 52a, the documents S are prevented from being caught by the end fence lower portion 52a.

A lower end of the end fence upper portion 74a overlaps with an upper end of the end fence lower portion 52a that rises up from the upstream end of the paper ejection tray 52, as illustrated in FIG. 4. The end fence upper portion 74a is positioned more inside than the end fence lower portion 52a, such that the end fence lower portion 52a does not obstruct opening and closing of the release unit 70.

An overlap width H2 between the lower end of the end fence upper portion 74a and the upper end of the end fence lower portion 52a is arbitrary, and not numerically limited in particular as long as a document S does not slide in between the lower end of the end fence upper portion 74a and the upper end of the end fence lower portion 52a.

Further, slanting of an intermediate portion upstream in the paper ejection tray 52 upward towards a downstream side prompts natural reverse flow of a document S ejected from the paper ejection port 53b and the end fence thereby has a function of aligning the upstream end edges of documents S. Therefore, the end fence preferably rises up approximately vertically.

A pressurizing direction in which the coil spring 72 pressurizes the drive roller 65b via the driven roller 65a is preferably a direction approximately parallel to this end fence.

That is, by eliminating arrangement of a feeding roller pair between the second image reading unit 67 and the paper ejection roller pair 65 and assuring a distance worth that arrangement as a distance of the paper ejection tray 52, a space below the driven roller 65a becomes a narrow and small space that is narrow and low.

Therefore, when the coil spring 72 or the like is arranged in this narrow and small space, if its pressurizing direction is made parallel to the end fence, extra parts are able to be eliminated and at the same time, contribution to space saving is achieved, a spring constant is able to be set low, and variation by the coil spring 72 is able to be suppressed.

Further, the release unit 70 supports the guide plate lower part 71, the driven roller 63a, the second reading guide 68, the driven roller 65a, the coil spring 72, the guide plate lower part 74 on the downstream side, and the like, by side frames 70a on both sides of the main-scanning direction in the ADF 50. In FIG. 2 and FIG. 3, only one of the side frames 70a in the depth direction of the page is illustrated.

Further, the release unit 70 has a support frame 70b that protrudes integrally with the side frame 70a towards the paper ejection tray 52 more than the end fence lower portion 52a. At a tip end of this support frame 70b, an engagement hole (not illustrated), which engages with the rotational axis 73 that is provided on a main body lateral surface of the ADF 50 and protrudes inwards, is formed, for example. This rotational axis 73 and the engagement hole may be formed in a reverse way.

If a distance separating the end fence lower portion 52a from the second image reading unit 67 is L1 and a distance separating the rotational axis 73, which is a rotational pivot of the release unit 70, from the second image reading unit 67 is L2, a relation, L1<L2, holds.

In the above configuration, for example, a stain, such as paper powder, is adhered, the ADF 50 is rotated in a release direction with respect to the image reading unit 40 and a space is secured below the ADF 50.

Next, the release unit 70 is rotated around the rotational axis 73 as the pivot from a used position illustrated in FIG. 2 to the released position illustrated in FIG. 3, and a peripheral portion including a reading surface 67a of the second image reading unit 67 is released.

Figure 8:
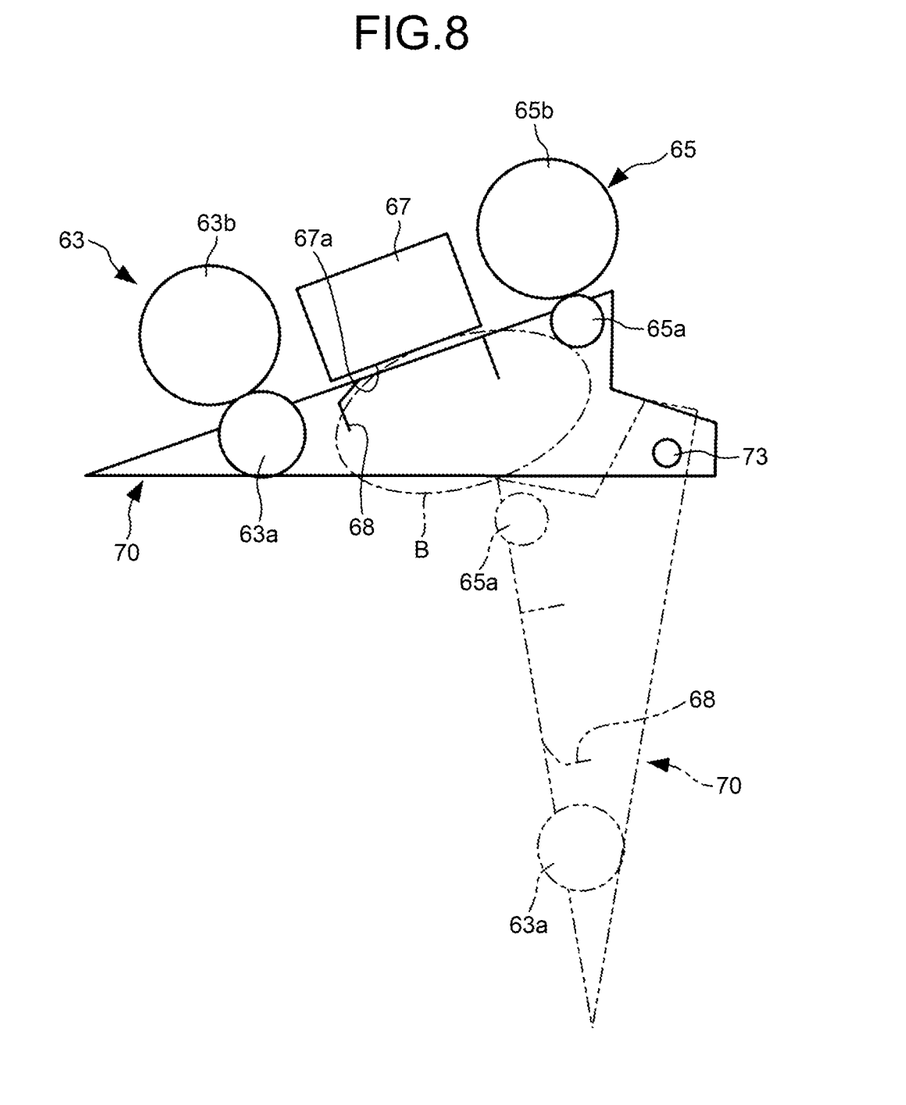
FIG. 8 is a diagram illustrating operations of a release cover in the automatic document feeder according to the embodiment of the present invention.

When this is done, since the rotational axis 73 that becomes the rotational pivot is positioned on the paper ejection tray 52 side than the end fence lower portion 52a, as illustrated in FIG. 8, a lower space of the reading surface 67a, that is, a work space B for maintenance of the reading surface 67a is able to be secured largely. Further, simultaneously therewith, a nip pressure of the paper ejection roller pair 65 is released.

As described, the release unit 70 widely releases a part of the document feeding path 56 including the reading surface 67a of the second image reading unit 67 by being rotated around the rotational axis 73 as the pivot.

Such a release operation of the release unit 70 is performed by a user as appropriate, when a foreign substance, such as dust or paper powder, adheres to the reading surface 67a of the second image reading unit 67 or when paper jam of a document occurs in the document feeding path 56. A user is able to easily clean the reading surface 67a and deal with paper jam by releasing the part of the document feeding path 56 including the reading surface 67a by the release operation of the release unit 70.

As described, according to this embodiment: the feeding unit 53, which causes an image of the first side of the document S to be read by the image reading unit 40 while feeding a document S; the second image reading unit 67, which reads an image of the second side of the document S while the document S is fed by the feeding unit 53; a release unit 70, which supports the second reading guide 68 opposite to the reading surface 67a of the second image reading unit 67 and enables the underneath of the reading surface 67a to be released; and the paper ejection tray 52, on which the document S that has been subjected to image reading and ejected from the paper ejection roller pair 65 is accumulated, are included; an end fence that rises up on an upstream side of a document ejection direction of the paper ejection tray 52 is configured of separate members that are the end fence upper portion 74a and the end fence lower portion 52a; and the rotational axis 73 of the release unit 70 is provided downstream of the end fence lower portion 52a in the feeding direction. As a result, even if a distance from the second image reading unit 67 to the paper ejection port 53b is shortened, upon release of the release unit 70, a space is able to be secured below the reading surface 67a, documents S are able to be prevented from sticking out or falling off from the paper ejection tray 52, and the nip pressure of the paper ejection roller pair 65 is able to be relieved.

As described above, an image reading device according to the present invention has an effect of being able to enable a space to be secured below a reading surface, documents to be prevented from sticking out or falling off, and a nip pressure of a paper ejection roller pair to be released, and is useful also for document reading devices (ADF) generally.

According to the present invention, an automatic document feeder, an image reading device, and an image forming apparatus are able to be provided, which enable, when a release unit is released, a space to be secured below a reading surface, documents to be prevented from sticking out or falling off, and a nip pressure of a paper ejection roller pair to be relieved, even if a distance from a second document reading unit to a paper ejection port is shortened.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An automatic document feeder, comprising:
    a feeding unit that causes an image of a first side of a document to be read by a first image reading unit while feeding the document;
    a second image reading unit that reads an image of a second side of the document while the feeding unit feeds the document;
    a release unit that supports a reading guide opposite to a reading surface of the second image reading unit and enables underneath of the reading surface to be released; and
    a paper ejection tray on which the document that has been subjected to image reading and ejected from a paper ejection roller pair is accumulated, wherein
    an end fence that rises up at a document ejection direction upstream side of the paper ejection tray is configured of separate members that are an upper portion and a lower portion, and
    a rotational pivot of the release unit is provided downstream from the end fence in a feeding direction.

2. The automatic document feeder according to claim 1, wherein the upper portion of the end fence is provided in the release unit and the lower portion of the end fence is provided in the paper ejection tray.

3. The automatic document feeder according to claim 1, wherein a height of the lower portion of the end fence is higher than a height in accumulating direction of a document load specification number set for the paper ejection tray.

4. The automatic document feeder according to claim 1, further comprising, on at least one side of a width direction orthogonal to a document feeding direction of the paper ejection tray, a document fall-off restriction member that protrudes towards the other side such that the document fall-off restriction member has an upper guide surface that is slanted downward towards the other side.

5. The automatic document feeder according to claim 4, wherein the document fall-off restriction member has a lower guide surface that is slanted upward towards the other side.

6. The automatic document feeder according to claim 1, wherein when a distance separating the end fence from the second image reading unit is L1 and a distance separating the rotational pivot of the release unit from the second image reading unit is L2, a relation, L1<L2, holds.

7. The automatic document feeder according to claim 1, wherein
the upper portion of the end fence is formed of a cover of the release unit, and
the lower portion of the end fence is formed of the paper ejection tray.

8. The automatic document feeder according to claim 1, wherein
the paper ejection roller pair includes: a driven roller that is one of a pair of rollers; and a pressurizing member that pressurizes this driven roller towards a drive roller that is the other one of the pair of rollers, and
the driven roller and the pressurizing member are held by the upper portion of the end fence.

9. The automatic document feeder according to claim 1, wherein the release unit has a white color portion at a position that is opposite to the second image reading unit when the release unit is closed.

10. The automatic document feeder according to claim 1, wherein the upper portion and lower portion of the end fence are partially overlapped with each other.

11. The automatic document feeder according to claim 1, wherein
the paper ejection roller pair includes: a driven roller that is one of a pair of rollers; and a pressurizing member that pressurizes this driven roller to a drive roller that is the other one of the pair of rollers, and
a direction in which the pressurizing member pressurizes the driven roller is a direction approximately parallel to the end fence.

12. An image reading device, comprising:
a first image reading unit that reads the image of the first side of the document; and
the automatic document feeder according to claim 1.

13. An image forming apparatus, comprising:
a first image reading unit that reads the image of the first side of the document; and
the automatic document feeder according to claim 1.

* * * * *